United States Patent
Chang (10) Patent No.: US 12,285,671 B1
(45) Date of Patent: Apr. 29, 2025

(54) MOUNTING SYSTEM FOR ATTACHMENT OF INTERCHANGEABLE EXERCISE MACHINE ACCESSORIES

(71) Applicant: BodyKore, Inc., Garden Grove, CA (US)

(72) Inventor: Leo Chang, Garden Grove, CA (US)

(73) Assignee: BodyKore, Inc., Garden Grove, CA (US)

( * ) Notice: Subject to any disclaimer, the term of this patent is extended or adjusted under 35 U.S.C. 154(b) by 0 days.

(21) Appl. No.: 18/922,740

(22) Filed: Oct. 22, 2024

Related U.S. Application Data (63) Continuation of application No. 18/829,693, filed on Sep. 10, 2024.

(51) Int. Cl.
  *A63B 71/00* (2006.01)
  *F16B 7/14* (2006.01)

(52) U.S. Cl.
  CPC ........ *A63B 71/0036* (2013.01); *F16B 7/1418* (2013.01); *F16B 7/1454* (2013.01)

(58) Field of Classification Search
  CPC ..... A63B 71/0036; A63B 47/00; A63B 55/00; A63B 60/56; A47B 57/26; A47B 96/1466; A47B 96/1475; F16B 7/1454; F16B 7/1418
  See application file for complete search history.

(56) References Cited

U.S. PATENT DOCUMENTS

| | | | | |
|---|---|---|---|---|
| 431,745 | A * | 7/1890 | Haven | A47B 57/26 108/106 |
| 6,017,009 | A * | 1/2000 | Swartz | A47B 57/10 248/245 |
| 9,216,314 | B2 * | 12/2015 | Chen | A63B 21/16 |
| 10,792,535 | B2 * | 10/2020 | Chou | A63B 1/00 |
| 10,967,217 | B2 * | 4/2021 | Arroyo | A63B 21/0626 |
| 11,725,872 | B2 * | 8/2023 | Jin | F25D 25/02 312/408 |
| 11,918,843 | B2 * | 3/2024 | Sorin | A63B 21/0783 |
| 2008/0004165 | A1 * | 1/2008 | Brawner | A63B 21/0783 482/104 |
| 2014/0200117 | A1 * | 7/2014 | Grider | A63B 17/04 482/104 |
| 2017/0007877 | A1 * | 1/2017 | Leipheimer | A63B 21/4029 |
| 2017/0246496 | A1 * | 8/2017 | Nelson | A63B 21/0724 |
| 2019/0247701 | A1 * | 8/2019 | Sergakis | F16B 45/00 |
| 2020/0114191 | A1 * | 4/2020 | Chen | A63B 71/0036 |

* cited by examiner

*Primary Examiner* — Ko H Chan
(74) *Attorney, Agent, or Firm* — Boon Intellectual Property Law, PLLC; Brian S. Boon (57) ABSTRACT

A mounting system for attachment exercise machine accessories wherein the mounting bracket is a separate piece that can be attached to the exercise machine prior to mounting of the accessory on the mounting bracket. The mounting bracket can be adapted to mount to existing exercise machines, and is easy to attach to an exercise machine separately from accessories to be mounted on it. The mounting bracket facilitates attachment of interchangeable accessories through a simplified mounting system that allows the user to keep both hands on the accessory during mounting. Play in the interface between the mounting bracket and accessory is taken up by a tensioning and locking device.

7 Claims, 10 Drawing Sheets

MOUNTING SYSTEM FOR ATTACHMENT OF INTERCHANGEABLE EXERCISE MACHINE ACCESSORIES

CROSS-REFERENCE TO RELATED APPLICATIONS

Each of the following patent applications is expressly incorporated herein by reference in its entirety:
Ser. No. 18/829,693

BACKGROUND

Field of the Art

The present invention is in the field of exercise equipment, and more particularly to devices for attachment of accessories to exercise equipment.

Discussion of the State of the Art

Many exercise machines are modular in nature, allowing for the performance of several different exercises using a single form of resistance. As an example, selectorized weight stack machines are a well-known modular type of exercise machine having a selectable stack of weights usable for several different types of exercise on the same machine. Often, accessories are available for such exercise machines. However, each accessory has its own mounting bracket permanently attached and must be mounted to the exercise machine as a single unit. Mounting single-piece accessories can be awkward, especially where the attachments are heavy or large enough to unwieldy. This is particularly the case for common horizontal pin type mounting brackets, wherein the accessory is attached to the frame of a weight machine using pins inserted horizontally through holes in the frame.

What is needed is a mounting system for attachment exercise machine accessories wherein the mounting bracket is a separate piece that can be attached to the exercise machine prior to mounting of the accessory on the mounting bracket.

SUMMARY

Accordingly, the inventor has conceived and reduced to practice, a mounting system for attachment exercise machine accessories wherein the mounting bracket is a separate piece that can be attached to the exercise machine prior to mounting of the accessory on the mounting bracket. The mounting bracket can be adapted to mount to existing exercise machines, and is easy to attach to an exercise machine separately from accessories to be mounted on it. The mounting bracket facilitates attachment of interchangeable accessories through a simplified mounting system that allows the user to keep both hands on the accessory during mounting. Play in the interface between the mounting bracket and accessory is taken up by a tensioning and locking device.

According to a preferred embodiment, a mounting system for attachment of interchangeable exercise machine accessories is disclosed, comprising: a mounting bracket configured to be attached to a vertical support column of an exercise machine having a plurality of horizontal holes for attachment of exercise accessories, the mounting bracket, comprising: a housing formed of a rigid material or materials having a front and two sides in a rectangular configuration, and configured to partially enclose the vertical support column within the front and two sides when mounted; a cutout in the housing, the cutout leaving a housing extension on one side of the housing for attachment of a first pin, and the cutout being configured to receive the vertical support column during insertion of the first pin into the vertical support column; the first pin attached perpendicularly to the housing extension and extending inwardly within the cutout and configured to be inserted into one or more first holes of the plurality of horizontal holes of the vertical support column; one or more holes in the housing configured to align with one or more second holes of the plurality of horizonal holes of the vertical support column for insertion of a separate locking pin; and one or more fastening devices for attachment of a mounting plate to the mounting bracket; a mounting plate, comprising: a housing formed of a rigid material or materials having a front and two sides in a rectangular configuration, and configured to partially enclose the mounting bracket within the front and two sides when mounted; one or more fastening devices for attachment of a mounting plate to the mounting bracket; and a support structure for an exercise accessory; and a locking mechanism, comprising a cam attached to the mounting plate via a cam pin, the cam being configured to engage with a surface of the mounting bracket when rotated.

According to an aspect of an embodiment, the one or more fastening devices used between the mounting bracket and mounting plate comprise one or more of tabs and slots, pins and holes, rails and slots, bolts or screws with corresponding threads in the mounting bracket or mounting plate, and magnets.

According to an aspect of an embodiment, the one or more fastening devices are configured to engage with one another via friction.

According to an aspect of an embodiment, the one or more fastening devices are tabs and slots, further wherein the tabs are angled to cause increasing friction within the slots as the tabs are inserted into the slots.

According to an aspect of an embodiment, the cam is mounted in-line with the support structure, and has an offset such that rotation of the cam causes an outer edge of the cam to engage with the surface of the mounting bracket.

According to an aspect of an embodiment, the locking mechanism further comprises a locking tab placed at the point of engagement of the outer edge of the cam with the surface of the mounting bracket, and the mounting bracket comprises a slot in its surface at that point of engagement for receiving the locking tab.

According to an aspect of an embodiment, the cam is mounted transversely to the support structure and has a graduated, wedge-shaped cross section such that rotation of the cam causes a side of the cam to engage with the surface of the mounting bracket.

DETAILED DESCRIPTION

The inventor has conceived, and reduced to practice, a mounting system for attachment exercise machine accessories wherein the mounting bracket is a separate piece that can be attached to the exercise machine prior to mounting of the accessory on the mounting bracket. The mounting bracket can be adapted to mount to existing exercise machines, and is easy to attach to an exercise machine separately from accessories to be mounted on it. The mounting bracket facilitates attachment of interchangeable accessories through a simplified mounting system that allows the user to keep both hands on the accessory during mounting. Play in the interface between the mounting bracket and accessory is taken up by a tensioning and locking device.

Note that while the exemplary embodiments shown herein primarily depict attachment of the mounting system to a vertical support column for selectable weight stack machines, the invention is not limited to such embodiments. In other embodiments, the mounting system may be adapted for attachment to other exercise machines and/or exercise apparatuses. For example, the mounting system may be adapted for attachment to other types of selectorized resistance exercise machines (e.g., band or spring resistances, electronically-controlled resistances, etc.), body-weight exercise trees (structures where exercises are performed using body weight and not moveable weights), free weight racks, and wall-mounted exercise racks and rails. A person of ordinary skill in the art will recognize that adaptation of the mounting system for attachment to other exercise machines will primarily involve modifying the mounting bracket for attachment to a column, beam, track, rail, support face, or other supporting structure of the other exercise machines and/or exercise apparatuses.

A person of ordinary skill in the art will understand that, while the embodiments shown herein depict a vertical support column with a square cross-section and a mounting system configured accordingly, the mounting system is not limited to embodiments configured for vertical support columns with square cross-sections, and may be adapted for use with vertical support columns having other cross-sectional shapes including, but not limited to, rectangular cross-sections, circular cross-sections (i.e., pipes or tubes), and ovular cross-sections. In such cases, for example with respect to circular or ovular cross-sections, the phrase "partially enclose" may be read to mean "partially surround" as necessary for appropriate context. Further, a person of ordinary skill in the art will understand that, while the embodiments shown herein depict a vertical support column having industry-standard horizontal holes for mounting of exercise attachments, the mounting system is not limited to embodiments configured for vertical support columns with having industry-standard horizontal holes for mounting of exercise attachments, and may be adapted for use with vertical support columns having other means of attachment including, but not limited to, indentations, teeth, ridges, flanges, friction surfaces, bolts or screws, and threaded or non-threaded holes for bolts or screws on one or more outside surfaces of the vertical support column; and indentations, teeth, ridges, flanges, friction surfaces, bolts or screws, and threaded or non-threaded holes for bolts or screws on one or more inside surfaces of the vertical support column.

Further, a person of ordinary skill in the art will understand that the drawings included herein show a side view of the mounting system so that the components of, and operation of, the mounting system can be clearly seen. However, the mounting system is not limited to side-mounted orientations and can be used in any orientation, including but not limited to front orientations, rear orientations, and horizontal orientations (e.g., upward facing and/or downward facing or hanging).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, an "offset" in a cam means that the cam is configured such that the distance from the axis of rotation of the cam to the outer edge of the cam at a given point changes as the cam rotates. This offset may be created either by placing the axis of rotation off center (e.g., in the case of a circular cam) or by changing the shape of the outer edge of the cam (e.g., in the case of elliptical or spiral cams).

DETAILED DESCRIPTION OF THE DRAWING FIGURES

Figure 1:
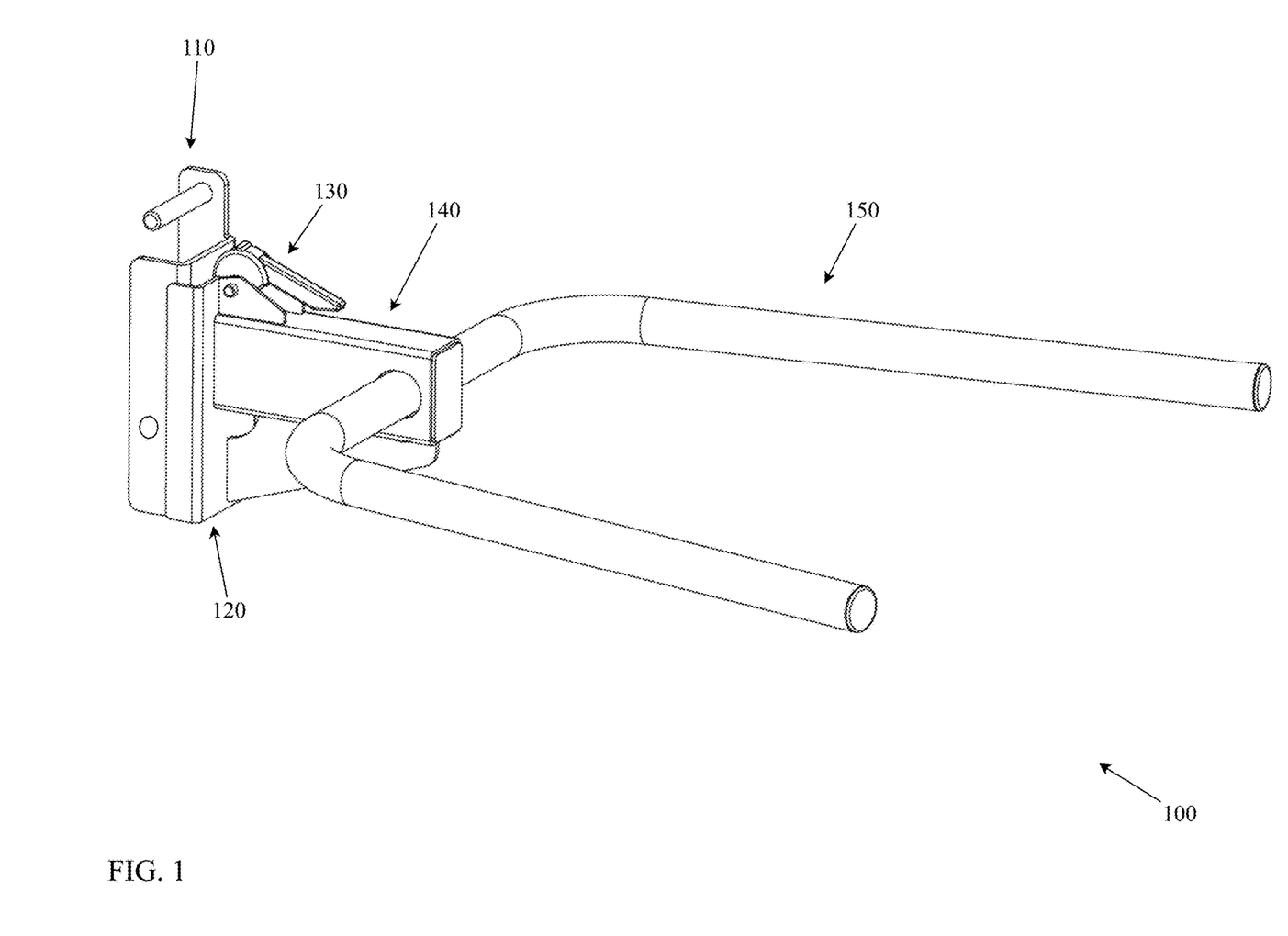
FIG. 1 illustrates an exemplary mounting system for attachment of interchangeable exercise machine accessories.

FIG. 1 illustrates an exemplary mounting system for attachment of interchangeable exercise machine accessories. The mounting system 100 of this embodiment comprises a mounting bracket 110, a mounting plate 120, a locking mechanism 130, and an accessory support 140.

The mounting bracket 110 of this embodiment is configured to be attached to a vertical frame support of a common selectable weight stack exercise machine. Selectable weight stack exercise machines typically comprise a steel frame having vertical support columns, the vertical support columns typically having horizontal holes drilled in them at regular intervals to allow for attachment of exercise accessories at various heights. In this embodiment, the mounting bracket 110 is installed onto a vertical support column by inserting an integrated pin through one or more first holes in the support column, rotating the mounting bracket 110 downward to align one or more holes in the mounting bracket with one or more second holes in the vertical support column, and inserting a separate locking pin through the hole in the mounting bracket with a second hole in the support column. The mounting bracket 110 is comprised of a rigid material or materials, and is configured to partially enclose the vertical support column so as to reduce side-to-side rocking motions while the exercise accessory is in use. The mounting bracket 110 further comprises one or more fastening receivers for attaching the mounting plate 120 to the mounting bracket. Note that in other embodiments, mounting bracket 110 may be configured differently for installation onto an exercise machine. For example, some exercise machines may have vertical support columns without horizonal holes, and the mounting bracket 110 may be configured to mount to the vertical support column by friction between the vertical support column and the mounting bracket (e.g., via a separate clamp or via a clamping action of the mounting bracket itself when installed). In some embodiments, the mounting bracket 110 may be installed on the exercise machine using bolts, screws, or other fasteners. For example, mounting bracket 110 might be a flat plate configured to be bolted onto a supporting face or platform of an exercise machine.

The mounting plate 120 of this embodiment is comprised of a rigid material or materials and comprises a rigid plate configured to attach to the mounting bracket 110 via one or more fasteners attached to the fastening receivers of the mounting bracket 110. In some embodiments, the fastening devices may be reversed wherein the fastening receivers are on the mounting plate 120 and the fasteners are on the mounting bracket 110. The mounting plate 120 of this embodiment is configured to partially enclose the mounting bracket 110 so as to reduce side-to-side rocking motions while the exercise accessory is in use.

The fastening devices used between the mounting bracket and the mounting plate are not limited to the particular configuration shown here. Some non-limiting examples of other fastening devices that could be used are: tabs and slots, pins and holes, rails and slots, bolts and/or screws with corresponding threads in the mounting bracket and/or mounting plate, and magnets. These fastening devices may be singularly or in any plurality, and combinations of different types of fastening devices may be used.

In this embodiment, a locking mechanism 130 is used to both to prevent disengagement of the mounting plate 120 from the mounting bracket 110 and to reduce slop or play in the interface between the mounting bracket 110 and the mounting plate 120. The locking mechanism 130 of this embodiment is attached as an integral part of the mounting plate, and comprises a cam with an offset wherein rotation of the cam toward the mounting bracket 110 causes the edge of the cam to press against the mounting bracket 110, providing pressure between the mounting bracket 110 and mounting plate 120, reducing any slop or play in the interface between the two and preventing disengagement of the mounting plate 120 from the mounting bracket 110 through friction caused by that pressure. The locking mechanism 130 of this embodiment is mounted in-line with the support structure 140. The locking mechanism 130 of this embodiment further comprises a locking tab which prevents the cam from accidentally releasing from the locked position.

The locking mechanism is not limited to the particular configuration shown here. Depending on various factors including, but not limited to, the forces generated on the mounting system 100 based on the type of exercise accessory to be used, a locking mechanism with different characteristics may be chosen. Some non-limiting examples of other locking mechanisms are: snail cams in-line with support structure or accessory (wherein snail cams are cams having a spiral shape which by definition have an offset owing to the changing distance from the center of the spiral to the edge of the spiral), elliptical cams in-line with support structure or accessory, wedge-shaped cams mounted perpendicularly to the support structure or accessory, wedged-shaped plates or pins as fastening devices that hold via friction without separate locking mechanisms, spring-loaded catches, magnetic catches, and separately-insertable wedges or pins.

One or more support structures 140 may be provided for attachment of exercise accessories. In this embodiment, the support structure 140 is permanently affixed to the mounting plate 140 and the associated exercise accessory 150 is permanently affixed to the support structure 140. In other embodiments, either the support structure 140 or the exercise accessory 150, or both, may be removable and/or interchangeable. As an example, the support structure 140 may comprise a fastening system whereby the accessory 150 may be removed and replaced with larger or smaller diameter bars or handles, longer or shorter bars or handles, larger or smaller pulleys for redirecting cables attached to resistance devices, or systems of pulleys configured to increase or reduce the amount of force required to exercise (e.g., using a block and tackle pulley system to reduce the amount of pulling force required independently of a weight stack).

Also shown in this diagram is an exemplary exercise accessory 150 which, in this example, is a dip bar wherein the user holds one bar in each hand and lowers and raises his or her body between the bars. The dip bar accessory is one of many types of fixed accessories that can be used with exercise machines. Such fixed accessories include, but are not limited to, chin-up bars, benches and rests, sit-up bars, various platforms, and various hand holds. Some fixed accessories may be adjustable, for example by raising the height of a bench, rest, or seat, changing the length or angle of bars, etc. Other examples of accessories that may be used with the mounting system include those with movable or partially-movable parts such as those having pulleys for redirecting the force of cables (e.g., cables running to weight stacks or other means of resistance) or those having swivels. Such accessories include, but are not limited to, pull-downs, pull-ups, rowing exercises, bicep curls, and tricep pushdowns. Other examples of accessories that may be used with the mounting system include those in which the mounting system is attached to a moveable part of the exercise machine, wherein moving the moveable part along a pivot, track, or other guide causes the resistance mechanism of the exercise machine to be engaged. Such accessories include, but are not limited to, bench presses on pivoting levers or tracks, deadlifts on pivoting levers or tracks, and squats on pivoting levers or tracks.

Note that while the exemplary embodiments shown herein primarily depict attachment of the mounting system to a vertical support column for selectable weight stack machines, the invention is not limited to such embodiments. In other embodiments, the mounting system may be adapted for attachment to other exercise machines and/or exercise apparatuses. For example, the mounting system may be adapted for attachment to other types of selectorized resistance exercise machines (e.g., band or spring resistances, electronically-controlled resistances, etc.), body-weight exercise trees (structures where exercises are performed using body weight and not moveable weights), free weight racks, and wall-mounted exercise racks and rails. A person of ordinary skill in the art will recognize that adaptation of the mounting system for attachment to other exercise machines will primarily involve modifying the mounting bracket for attachment to a column, beam, track, rail, support face, or other supporting structure of the other exercise machines and/or exercise apparatuses.

Figure 2:
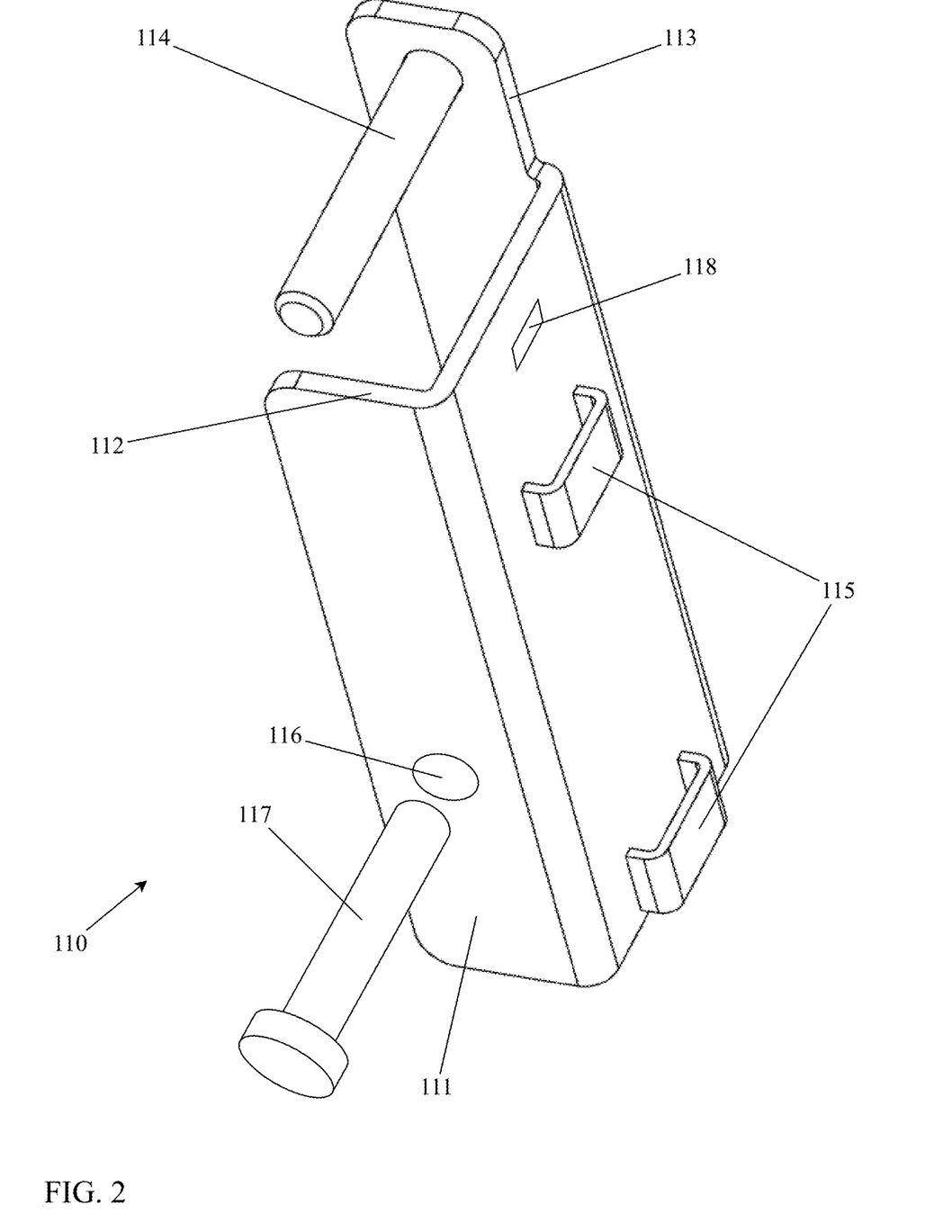
FIG. 2 illustrates an exemplary mounting bracket for a mounting system for attachment of interchangeable exercise machine accessories.

FIG. 2 illustrates an exemplary mounting bracket for a mounting system for attachment of interchangeable exercise machine accessories. The mounting bracket 110 of this embodiment is configured to be removably attached to a vertical frame support of a common selectable weight stack exercise machine separately from any exercise accessory which may be used with the mounting bracket 110. Selectable weight stack exercise machines typically comprise a steel frame having vertical support columns, the vertical support columns typically having horizontal holes drilled in them at regular intervals to allow for attachment of exercise accessories at various heights.

The mounting bracket 110 comprises a housing 111 comprised of a rigid material. In this embodiment, the housing 111 is made of steel and is shaped to partially enclose the vertical support column so as to reduce side-to-side rocking motions while the exercise accessory is in use. The shell 111 further comprises a cutout 112 to allow the integrated pin 114 to be inserted through holes in a vertical support column by placing the mounting bracket 110 at an angle away from the longitudinal axis of the vertical support column such that the mounting bracket 110 slides in a horizontal motion over the vertical support column into the cutout 112. The mounting bracket is then lowered (or raised) to a position parallel to the longitudinal axis of the vertical support column for insertion of the separate locking pin 117 (if used).

The mounting bracket 110 has one or more fastening receivers 115 for attachment of the mounting plate 120. In this embodiment, the fastening receivers 115 are raised slots permanently affixed to the shell 111, configured to receive fasteners which are part of the mounting plate 120. The fastening devices used between the mounting bracket and the mounting plate are not limited to the particular configuration shown here. Some non-limiting examples of other fastening devices that could be used are: tabs and slots, pins and holes, rails and slots, bolts and/or screws with corresponding threads in the mounting bracket and/or mounting plate, and magnets. These fastening devices may be singularly or in any plurality, and combinations of different types of fastening devices may be used.

The mounting bracket 110 of this embodiment further comprises a slot 118 for holding a locking tab of a cam that is part of a locking mechanism 130.

In this embodiment, the mounting bracket 110 is installed onto a vertical support column by inserting an integrated pin 114 through one or more first holes in a vertical support column, rotating the mounting bracket 110 downward to align one or more holes 116 in the mounting bracket with one or more second holes in the vertical support column, and inserting a separate locking pin 117 through the hole in the mounting bracket and through the aligned second hole in the support column. Depending on the configuration, the integrated pin 114 may be inserted through a hole on one side of the vertical support column or through holes on both sides of the vertical support column. Likewise, depending on configuration, the separate locking pin 117 may be inserted through a hole on one side of the mounting bracket 110 or through holes on both sides of the mounting bracket 110 and/or through a hole on one side of the vertical support column or through holes on both sides of the vertical support column.

The mounting bracket 110 is configured to partially enclose the vertical support column so as to reduce side-to-side rocking motions while the exercise accessory is in use. The mounting bracket 110 further comprises one or more fastening receivers for attaching the mounting plate 120 to the mounting bracket. Note that in other embodiments, mounting bracket 110 may be configured differently for installation onto an exercise machine. For example, some exercise machines may have vertical support columns without horizonal holes, and the mounting bracket 110 may be configured to mount to the vertical support column by friction between the vertical support column and the mounting bracket (e.g., via a separate clamp or via a clamping action of the mounting bracket itself when installed). In some embodiments, the mounting bracket 110 may be installed on the exercise machine using bolts, screws, or other fasteners. For example, mounting bracket 110 might be a flat plate configured to be bolted onto a supporting face or platform of an exercise machine.

Note that while the exemplary embodiments shown herein primarily depict attachment of the mounting system to a vertical support column for selectable weight stack machines, the invention is not limited to such embodiments. In other embodiments, the mounting system may be adapted for attachment to other exercise machines and/or exercise apparatuses. For example, the mounting system may be adapted for attachment to other types of selectorized resistance exercise machines (e.g., band or spring resistances, electronically-controlled resistances, etc.), body-weight exercise trees (structures where exercises are performed using body weight and not moveable weights), free weight racks, and wall-mounted exercise racks and rails. A person of ordinary skill in the art will recognize that adaptation of the mounting system for attachment to other exercise machines will primarily involve modifying the mounting bracket for attachment to a column, beam, track, rail, support face, or other supporting structure of the other exercise machines and/or exercise apparatuses.

Figure 3:
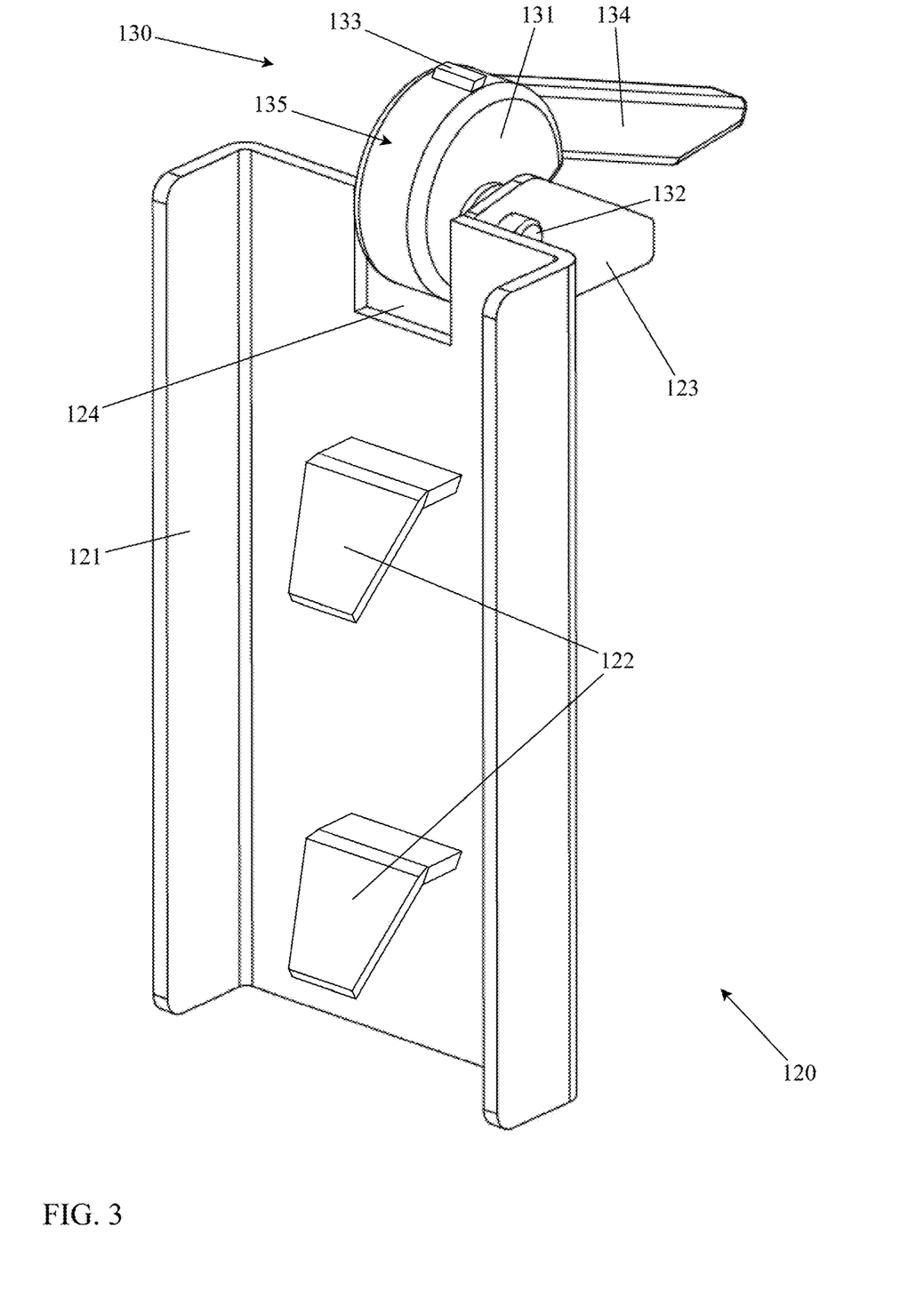
FIG. 3 illustrates an exemplary mounting plate for a mounting system for attachment of interchangeable exercise machine accessories.

FIG. 3 illustrates an exemplary mounting plate for a mounting system for attachment of interchangeable exercise machine accessories. The mounting plate 120 of this embodiment is configured to be removably attached to the mounting bracket 110. The mounting plate 120 comprises a housing 121 comprised of a rigid material. In this embodiment, the housing 121 is made of steel and is shaped to partially enclose the mounting bracket 110 so as to reduce side-to-side rocking motions while the exercise accessory is in use. The shell 121 further comprises a cam bracket 123 to support the locking mechanism 130, and a cutout 124 to allow the cam 131 of the locking mechanism 130 to engage with the surface of the mounting bracket 110.

The mounting bracket 110 has one or more fasteners 122 for attachment of the mounting plate 120 to the mounting bracket 110. In this embodiment, the fasteners 122 are angled tabs permanently affixed to the housing 121, configured to be inserted into the slots 115 of the mounting bracket by sliding the mounting plate 120 in a downward motion causing the tabs 122 of the mounting plate 120 to be inserted into the slots 115 of the mounting bracket. In this embodiment, the tabs 122 are angled away from the vertical plane of the mounting plate 110 so as to cause the tabs 122 not only to be inserted into the slots 115 as for non-angled tabs, but also to wedge themselves within the slots (and/or against the surface of the mounting bracket 110) by friction to reduce slop and play between the mounting bracket 110 and mounting plate 120, and so as to resist disengagement of the mounting plate 120 from the mounting bracket 110.

The fastening devices used between the mounting bracket and the mounting plate are not limited to the particular configuration shown here. Some non-limiting examples of other fastening devices that could be used are: tabs and slots, pins and holes, rails and slots, bolts and/or screws with corresponding threads in the mounting bracket and/or mounting plate, and magnets. These fastening devices may be singularly or in any plurality, and combinations of different types of fastening devices may be used. In some embodiments, the fastening devices may be reversed wherein the fastening receivers are on the mounting plate 120 and the fasteners are on the mounting bracket 110. The mounting plate 120 of this embodiment is configured to partially enclose the mounting bracket 110 so as to reduce side-to-side rocking motions while the exercise accessory is in use.

The locking mechanism 130 of this embodiment is used to both to prevent disengagement of the mounting plate 120 from the mounting bracket 110 and to reduce slop or play in the interface between the mounting bracket 110 and the mounting plate 120. The locking mechanism 130 of this embodiment is attached to the cam bracket 123 of the mounting plate 120 via a pin 132 inserted through the cam bracket 123 and cam 131. The locking mechanism of this embodiment further comprises a circular cam 131 with an offset rotational axis wherein the pin 132 is inserted through a hole in the cam 131 that is offset from the central axis of the circular cam 131. Rotation of the cam 131 toward the mounting bracket 110 using the cam's handle 134 causes the front edge 135 of the cam 131 to press against the mounting bracket 110, providing pressure between the mounting bracket 110 and mounting plate 120, reducing any slop or play in the interface between the two and preventing disengagement of the mounting plate 120 from the mounting bracket 110 through friction caused by that pressure. The locking mechanism 130 of this embodiment is mounted in-line with the support structure 140. The locking mechanism 130 of this embodiment further comprises a locking tab 133 which is inserted into the slot 118 when the cam is rotated toward the mounting bracket 110 which prevents the cam from accidentally releasing from the locked position.

The locking mechanism is not limited to the particular configuration shown here. Depending on various factors including, but not limited to, the forces generated on the mounting system 100 based on the type of exercise accessory to be used, a locking mechanism with different characteristics may be chosen. Some non-limiting examples of other locking mechanisms are: snail cams in-line with support structure or accessory (wherein snail cams are cams having a spiral shape), elliptical cams in-line with support structure or accessory, wedge-shaped cams mounted perpendicularly to the support structure or accessory, wedged-shaped plates or pins as fastening devices that hold via friction without separate locking mechanisms, spring-loaded catches, magnetic catches, and separately-insertable wedges or pins.

Figure 4:
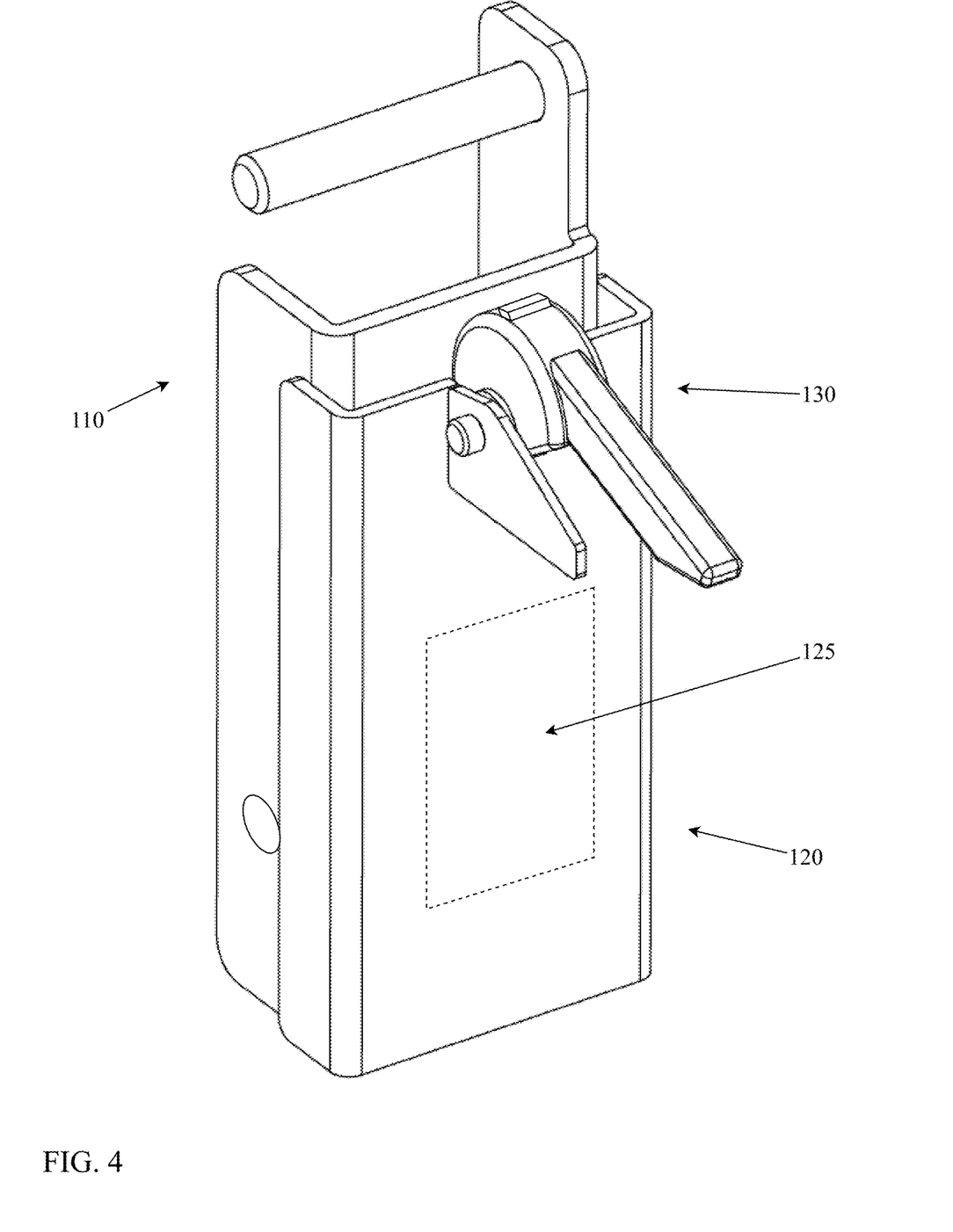
FIG. 4 illustrates attachment of an exemplary mounting plate to an exemplary mounting bracket.

FIG. 4 illustrates attachment of an exemplary mounting plate to an exemplary mounting bracket. This diagram shows a perspective view of the mounting plate 120 attached to the mounting bracket 110 with the locking mechanism 130 shown in an unlocked position. The dotted line area 125 indicates a surface where a support structure for an exercise accessory may be attached.

Figure 5:
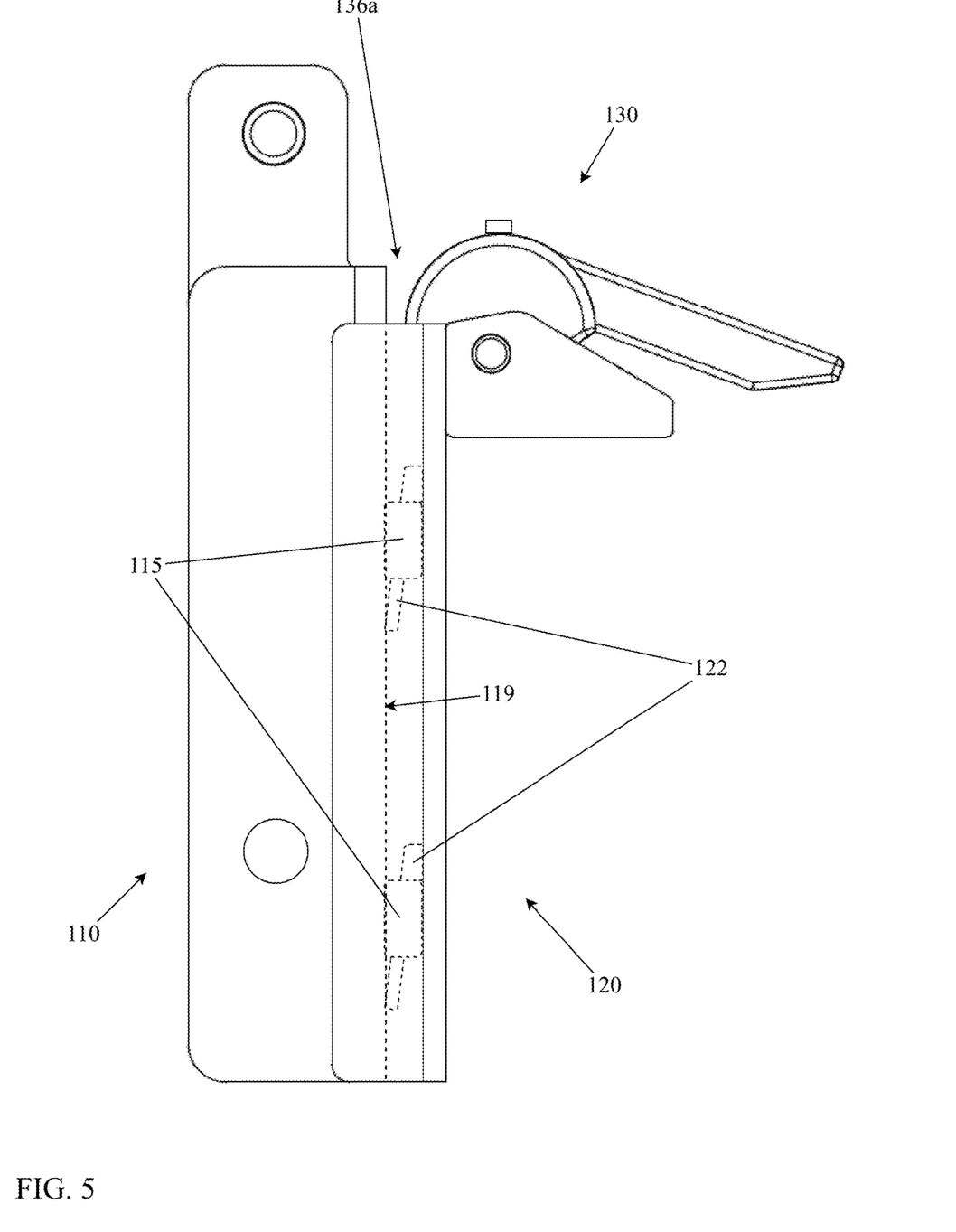
FIG. 5 illustrates additional detail regarding attachment of an exemplary mounting plate to an exemplary mounting bracket.

FIG. 5 illustrates additional detail regarding attachment of an exemplary mounting plate to an exemplary mounting bracket. This diagram shows a side view of mounting plate 120 attached to the mounting bracket 110 with the locking mechanism 130 shown in an unlocked position. The fastener receivers 115 (in this case slots) of the mounting bracket 110 inside the interface between the mounting bracket 110 and the mounting plate 120 attached are shown in dotted lines. The fasteners 122 (in this case angled tabs) of the mounting plate 120 inside the interface are shown in dotted lines as being inserted into the slots 115 from above. The tabs 122 are shown as being angled so as to cause the tabs 122 not only to be inserted into the slots 115 as for non-angled tabs, but also to wedge themselves within the slots (and/or against the front surface 119 of the mounting bracket 110) by friction to reduce slop and play between the mounting bracket 110 and mounting plate 120, and so as to resist disengagement of the mounting plate 120 from the mounting bracket 110.

This diagram further shows a gap 136*a* between the cam 131 of the locking mechanism 130 and the mounting bracket 110, which gap will be closed when the cam 131 is engaged by rotating it toward the mounting bracket 110 using the cam handle 134.

A person of ordinary skill in the art will understand that, while the embodiments shown herein depict a vertical support column with a square cross-section and a mounting system configured accordingly, the mounting system is not limited to embodiments configured for vertical support columns with square cross-sections, and may be adapted for use with vertical support columns having other cross-sectional shapes including, but not limited to, rectangular cross-sections, circular cross-sections (i.e., pipes or tubes), and ovular cross-sections. In such cases, for example with respect to circular or ovular cross-sections, the phrase "partially enclose" may be read to mean "partially surround" as necessary for appropriate context. Further, a person of ordinary skill in the art will understand that, while the embodiments shown herein depict a vertical support column having industry-standard horizontal holes for mounting of exercise attachments, the mounting system is not limited to embodiments configured for vertical support columns with having industry-standard horizontal holes for mounting of exercise attachments, and may be adapted for use with vertical support columns having other means of attachment including, but not limited to, indentations, teeth, ridges, flanges, friction surfaces, bolts or screws, and threaded or non-threaded holes for bolts or screws on one or more outside surfaces of the vertical support column; and indentations, teeth, ridges, flanges, friction surfaces, bolts or screws, and threaded or non-threaded holes for bolts or screws on one or more inside surfaces of the vertical support column.

Further, a person of ordinary skill in the art will understand that the drawings included herein show a side view of the mounting system so that the components of, and operation of, the mounting system can be clearly seen. However, the mounting system is not limited to side-mounted orientations and can be used in any orientation, including but not limited to front orientations, rear orientations, and horizontal orientations (e.g., upward facing and/or downward facing or hanging).

Figure 6:
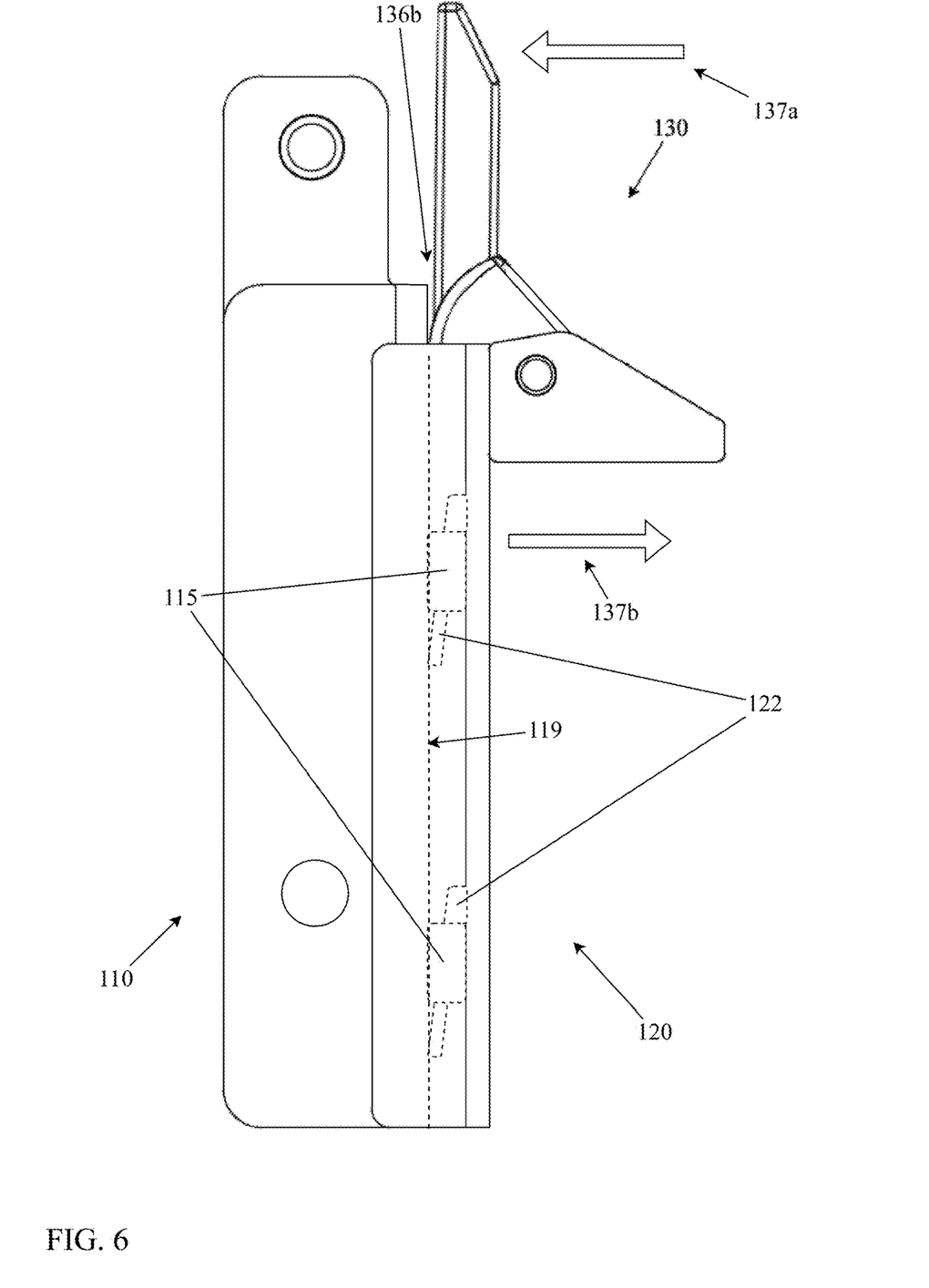
FIG. 6 illustrates additional detail regarding attachment of an exemplary mounting plate to an exemplary mounting bracket.

FIG. 6 illustrates additional detail regarding attachment of an exemplary mounting plate to an exemplary mounting bracket. This diagram shows a side view of mounting plate 120 attached to the mounting bracket 110 with the locking mechanism 130 shown in a locked position. The fastener receivers 115 (in this case slots) of the mounting bracket 110 inside the interface between the mounting bracket 110 and the mounting plate 120 attached are shown in dotted lines. The fasteners 122 (in this case angled tabs) of the mounting plate 120 inside the interface are shown in dotted lines as being inserted into the slots 115 from above. The tabs 122 are shown as being angled so as to cause the tabs 122 not only to be inserted into the slots 115 as for non-angled tabs, but also to wedge themselves within the slots (and/or against the front surface 119 of the mounting bracket 110) by friction to reduce slop and play between the mounting bracket 110 and mounting plate 120, and so as to resist disengagement of the mounting plate 120 from the mounting bracket 110.

This diagram further shows that the gap 136*b* between the cam 131 of the locking mechanism 130 and the mounting bracket 110 has been closed by engagement of the cam 131 by rotating it toward the mounting bracket 110 using the cam handle 134 as shown by the arrow at 137*a*. The pressure of the edge of the cam 135 against the surface of the mounting bracket 119 pushes the mounting plate 120 away from the mounting bracket 110 in the direction of arrow 137*b*, thus reducing any slop or play in the interface between the mounting bracket 110 and mounting plate 120, as well as increasing the friction between the fasteners 122 and fastening receivers, further resisting disengagement of the mounting plate 120 from the mounting bracket 110.

A person of ordinary skill in the art will understand that, while the embodiments shown herein depict a vertical support column with a square cross-section and a mounting system configured accordingly, the mounting system is not limited to embodiments configured for vertical support columns with square cross-sections, and may be adapted for use with vertical support columns having other cross-sectional shapes including, but not limited to, rectangular cross-sections, circular cross-sections (i.e., pipes or tubes), and ovular cross-sections. In such cases, for example with respect to circular or ovular cross-sections, the phrase "partially enclose" may be read to mean "partially surround" as necessary for appropriate context. Further, a person of ordinary skill in the art will understand that, while the embodiments shown herein depict a vertical support column having industry-standard horizontal holes for mounting of exercise attachments, the mounting system is not limited to embodiments configured for vertical support columns with having industry-standard horizontal holes for mounting of exercise attachments, and may be adapted for use with vertical support columns having other means of attachment including, but not limited to, indentations, teeth, ridges, flanges, friction surfaces, bolts or screws, and threaded or non-threaded holes for bolts or screws on one or more outside surfaces of the vertical support column; and indentations, teeth, ridges, flanges, friction surfaces, bolts or screws, and threaded or non-threaded holes for bolts or screws on one or more inside surfaces of the vertical support column.

Further, a person of ordinary skill in the art will understand that the drawings included herein show a side view of the mounting system so that the components of, and operation of, the mounting system can be clearly seen. However, the mounting system is not limited to side-mounted orientations and can be used in any orientation, including but not limited to front orientations, rear orientations, and horizontal orientations (e.g., upward facing and/or downward facing or hanging).

Figure 7:
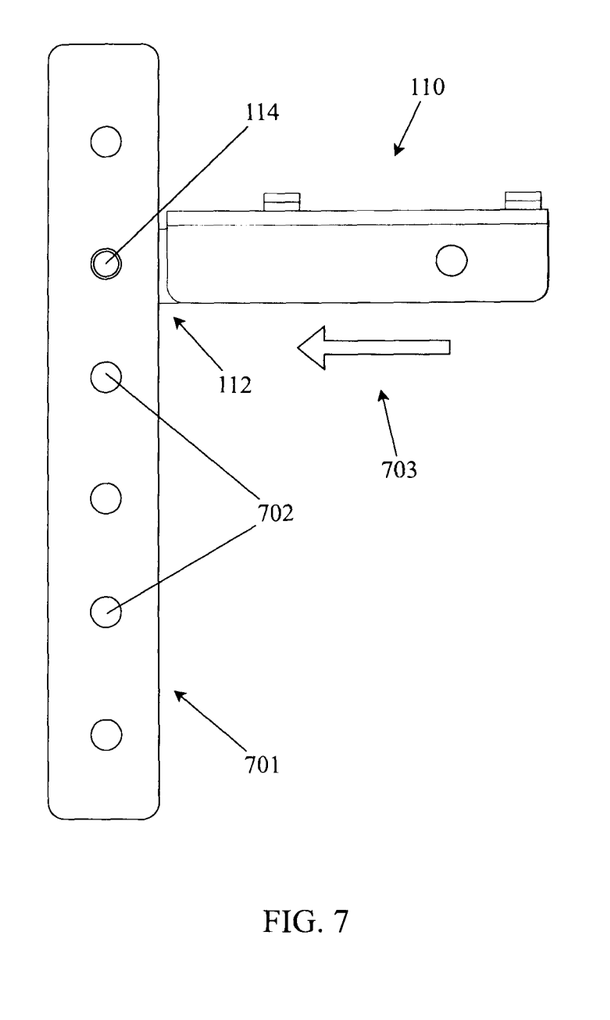
FIGS. 7 and 8 illustrate attachment of an exemplary mounting bracket to a frame of an exercise machine.
Figure 8:
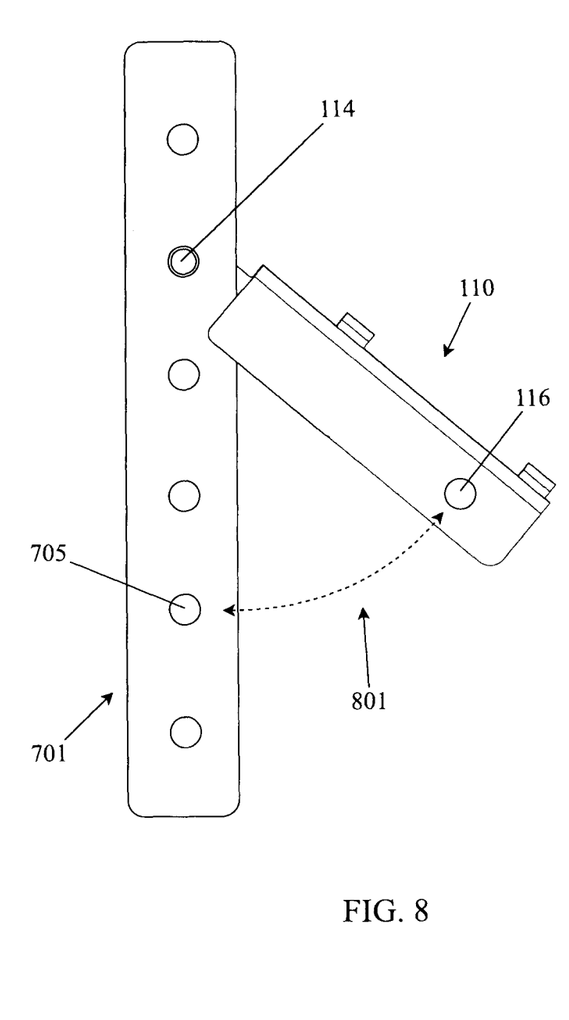

FIGS. 7 and 8 illustrate attachment of an exemplary mounting bracket to a frame of an exercise machine. In this embodiment, the mounting bracket 110 is installed onto a vertical support column 701 of an exercise machine. The vertical support column 701 has one or more horizontal holes 702 evenly spaced along its length for insertions of pins. During installation, the mounting bracket 110 is held at an angle away from the longitudinal axis of the vertical support column as shown in FIG. 7 (which shows the mounting bracket being held perpendicular to the longitudinal axis of the vertical support column 701) and placing the mounting bracket 110 behind the vertical support column 701 as indicated by arrow 703. The integrated pin 114 is placed through one or more first holes in the vertical support column 701, such that the mounting bracket 110 slides in a horizontal motion (in this diagram toward the viewer) over the vertical support column 701 into a cutout 112 of the mounting bracket 110. The mounting bracket 110 is then lowered (or raised for removal) along the arc of arrow 801 shown in FIG. 8 to a position parallel to the longitudinal axis of the vertical support column for insertion of the separate locking pin 117 (if used). The mounting bracket 110 is configured to partially enclose the vertical support column so as to reduce side-to-side rocking motions while the exercise accessory is in use.

Depending on the configuration, the integrated pin 114 may be inserted through a hole on one side of the vertical support column or through holes on both sides of the vertical support column (as shown in this diagram). Likewise, depending on configuration, the separate locking pin may be inserted through a hole on one side of the mounting bracket 110 or through holes on both sides of the mounting bracket 110 and/or through a hole on one side of the vertical support column or through holes on both sides of the vertical support column.

A person of ordinary skill in the art will understand that, while the embodiments shown herein depict a vertical support column with a square cross-section and a mounting system configured accordingly, the mounting system is not limited to embodiments configured for vertical support columns with square cross-sections, and may be adapted for use with vertical support columns having other cross-sectional shapes including, but not limited to, rectangular cross-sections, circular cross-sections (i.e., pipes or tubes), and ovular cross-sections. In such cases, for example with respect to circular or ovular cross-sections, the phrase "partially enclose" may be read to mean "partially surround" as necessary for appropriate context. Further, a person of ordinary skill in the art will understand that, while the embodiments shown herein depict a vertical support column having industry-standard horizontal holes for mounting of exercise attachments, the mounting system is not limited to embodiments configured for vertical support columns with having industry-standard horizontal holes for mounting of exercise attachments, and may be adapted for use with vertical support columns having other means of attachment including, but not limited to, indentations, teeth, ridges, flanges, friction surfaces, bolts or screws, and threaded or non-threaded holes for bolts or screws on one or more outside surfaces of the vertical support column; and indentations, teeth, ridges, flanges, friction surfaces, bolts or screws, and threaded or non-threaded holes for bolts or screws on one or more inside surfaces of the vertical support column.

Further, a person of ordinary skill in the art will understand that the drawings included herein show a side view of the mounting system so that the components of, and operation of, the mounting system can be clearly seen. However, the mounting system is not limited to side-mounted orientations and can be used in any orientation, including but not limited to front orientations, rear orientations, and horizontal orientations (e.g., upward facing and/or downward facing or hanging).

Figure 9:
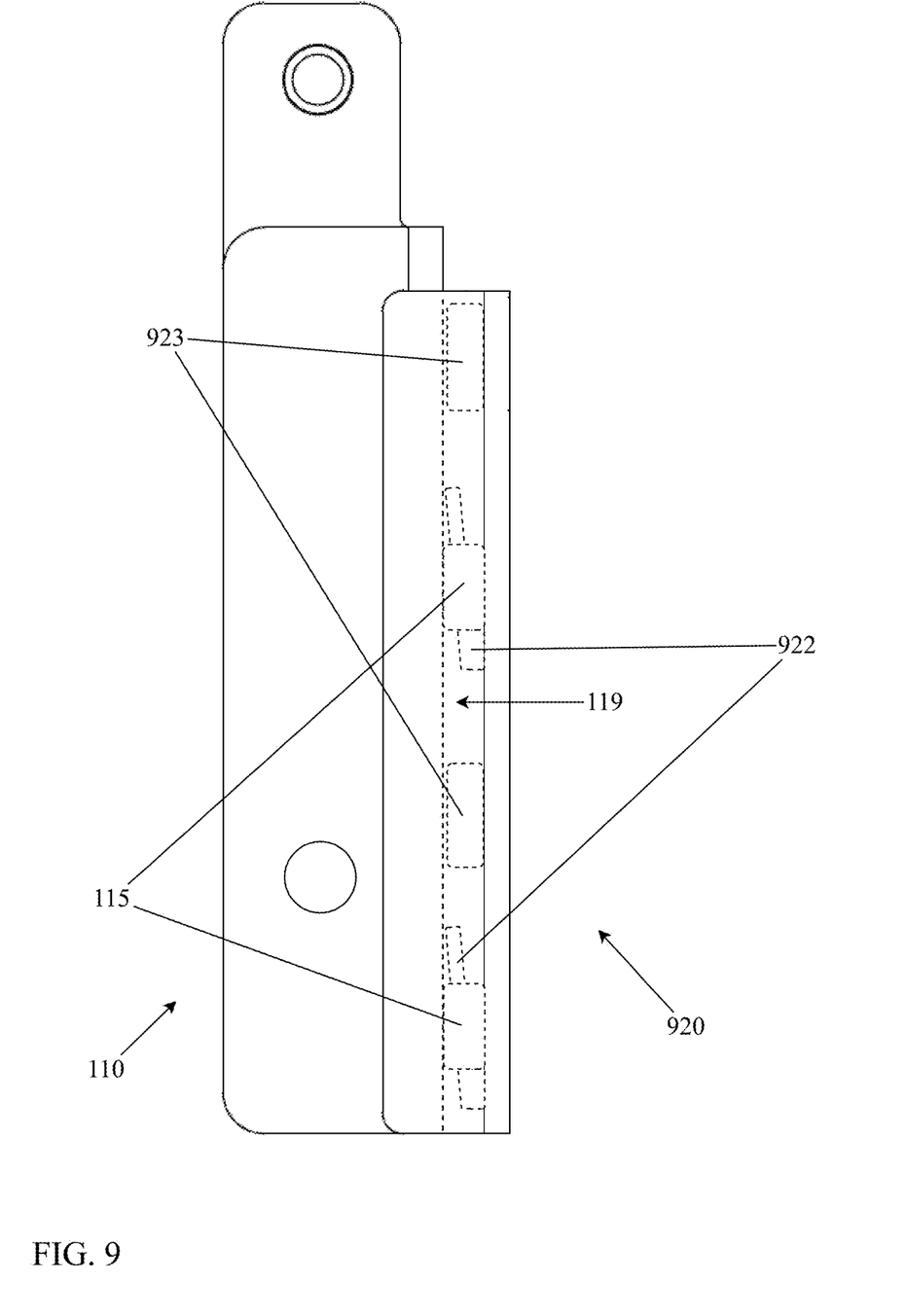
FIG. 9 illustrates an alternate embodiment of an exemplary mounting bracket.

FIG. 9 illustrates an alternate embodiment of an exemplary mounting plate. The diagram of this alternate embodiment shows a side view of mounting plate 920 attached to the mounting bracket 110. In this embodiment, the locking mechanism is one or more magnets 923. The fastener receivers 115 (in this case slots) of the mounting bracket 110 inside the interface between the mounting bracket 110 and the mounting plate 120 attached are shown in dotted lines. The fasteners 922 (in this case angled tabs similar to those of fasteners 122) of the mounting plate 120 inside the interface are shown in dotted lines as being inserted into the slots 115 from below. The tabs 122 are shown as being angled so as to cause the tabs 922 not only to be inserted into the slots 115 as for non-angled tabs, but also to wedge themselves within the slots (and/or against the front surface 119 of the mounting bracket 110) by friction to reduce slop and play between the mounting bracket 110 and mounting plate 920, and so as to resist disengagement of the mounting plate 120 from the mounting bracket 110.

Figure 10:
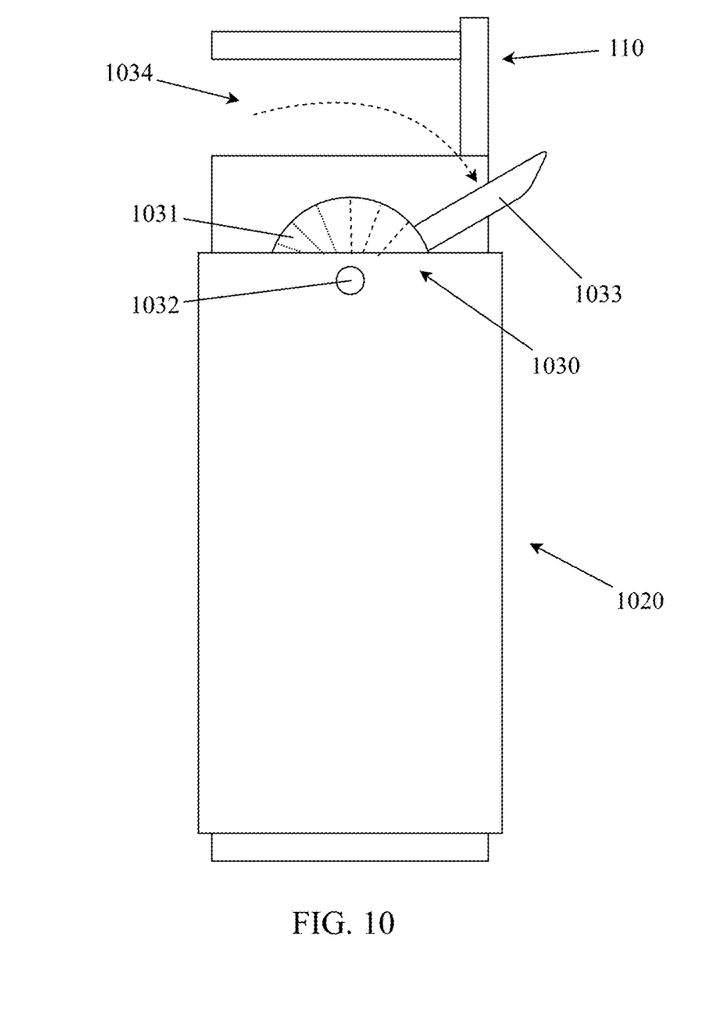
FIGS. 10 and 11 illustrate an alternate embodiment of an exemplary mounting plate.
Figure 11:
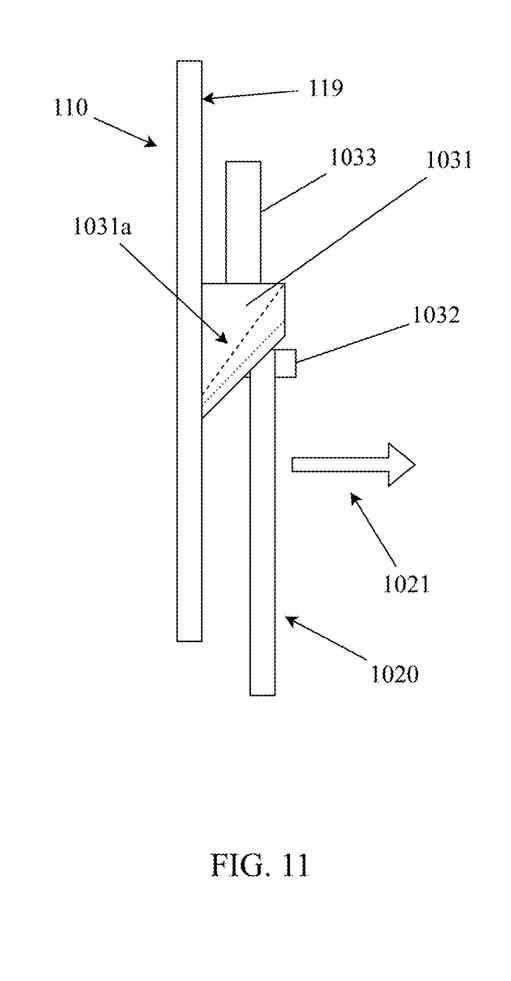

This alternate embodiment would be useful when the forces on the exercise accessory are in an upward direction during use. The magnets 923 used as a locking mechanism (optionally combined with the friction caused by angled tabs, as described above) provide sufficient support to hold the exercise accessory in place when not in use, while allowing for easy removal and exchange with other exercise accessories simply by pulling downward on the mounting plate 920 to FIGS. 10 and 11 illustrate another alternate embodiment of an exemplary mounting plate. This diagram shows a front view of mounting plate 1020 attached to the mounting bracket 110 with a transversely-mounted locking mechanism 1030. The locking mechanism is shown in this diagram in a locked position. As described in previous embodiments, the mounting plate 1020 attaches to the mounting bracket 110 using one or more sets of fasteners and fastener receivers (not shown in this diagram). In this alternate embodiment, the locking mechanism 1030 is transversely mounted relative to the support structure for the exercise accessory. The transversely-mounted locking mechanism 1030 comprises a cam 1031, a pin 1032 acting as a pivot point for the cam 1032, and a cam handle 1033 for opening and closing the cam 1031. However, in contrast to the in-line cam locking mechanism 130 of previous embodiments, the cam 1030 of this embodiment has a graduated, wedge-shaped cross section 1031a indicated by the dashed and dotted lines of 1031 in FIG. 10 and the dashed and dotted lines and angled face shown at 1031a. The graduated, wedge-shaped portion of the cam 1031a is thinner when the cam is in the unlocked position and thicker when the cam is in the locked position. As the cam 1031 is closed in the direction of arrow 1034 using handle 1033, a side of the cam engages with a surface of the mounting bracket 119, and the wedge-shaped portion 1031a of the cam 1031 is driven between the surface of the mounting bracket 119 and the portion of the mounting plate where the pin 1032 is attached, forcing the mounting plate 1020 in the direction of arrow 1021, increasing the friction on the pins. Note that the pin 1032 of this embodiment is configured to have some movement along its central axis to as to allow the wedge-shaped portion of the cam to push the mounting plate 1020 outward in the direction of arrow 1021.

This diagram further shows that the gap 136b between the cam 131 of the locking mechanism 130 and the mounting bracket 110 has been closed by engagement of the cam 131 by rotating it toward the mounting bracket 110 using the cam handle 134 as shown by the arrow at 137a. The pressure of the edge of the cam 135 against the surface of the mounting bracket 119 pushes the mounting plate 120 away from the mounting bracket 110 in the direction of arrow 137b, thus reducing any slop or play in the interface between the mounting bracket 110 and mounting plate 120, as well as increasing the friction between the fasteners and fastener receivers of the one or more sets of fasteners and fastener receivers (not shown in this diagram).

Figure 12:
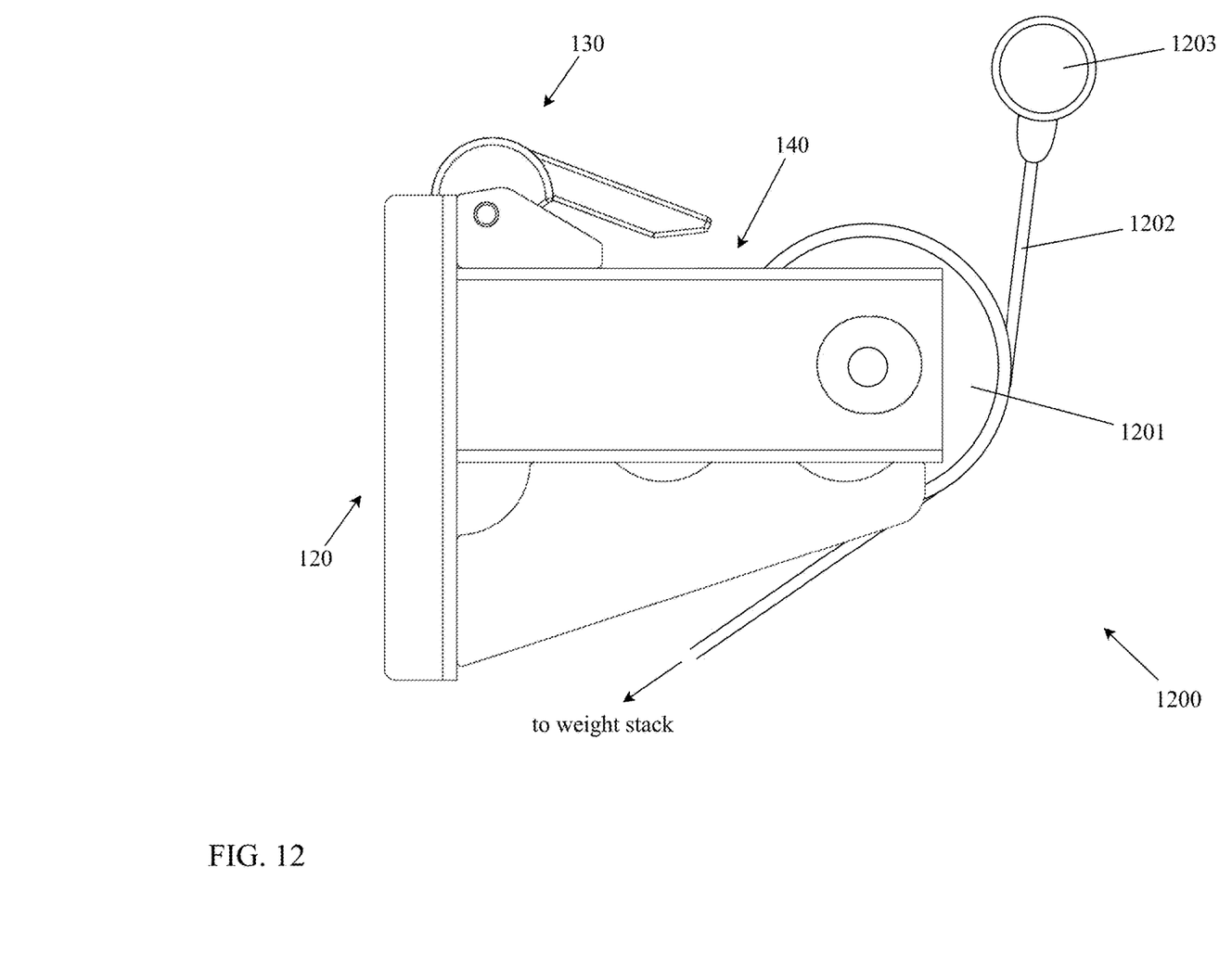
FIG. 12 illustrates another exemplary interchangeable accessory.

FIG. 12 illustrates another exemplary interchangeable accessory. In this alternate example, the exercise accessory is a handle bar 1203 (shown in cross section from one end of the bar) attached to a cable 1202 running around a pulley 1201 to a weight stack or other resistance device (not shown). This sort of pulley-based cable redirection mechanism is common in selectable weight stack exercise machines, but the pulleys are typically permanently attached to the exercise machine at fixed locations. This exemplary interchangeable accessory allows for repositioning of a pulley for an exercise accessory, as well as allowing for quick and easy changes of pulley sizes and/or configurations. For example, the single pulley shown here that redirects the pull force of the handle bar 1203 upward could be exchanged for a dual-pulley system that redirects the pull force of the handle bar 1203 horizontally, allowing for different exercises to be performed using the same exercise accessory without having to change the mounting bracket.

What is claimed is:

1. A mounting system for attachment of interchangeable exercise machine accessories, comprising:
    a mounting bracket configured to be attached to a vertical support column of an exercise machine having a plurality of horizontal holes for attachment of exercise accessories, the mounting bracket, comprising:
        a housing formed of a rigid material or materials having a front and two sides in a partial rectangular configuration, and configured to partially enclose the vertical support column within the front and two sides when mounted;
        a cutout in the housing, the cutout leaving a housing extension on one side of the housing for attachment of a first pin, and the cutout being configured to receive the vertical support column during insertion of the first pin into the vertical support column;
        the first pin attached perpendicularly to the housing extension and extending inwardly within the cutout and configured to be inserted into one or more first holes of the plurality of horizontal holes of the vertical support column;
        one or more holes in the housing configured to align with one or more second holes of the plurality of horizonal holes of the vertical support column for insertion of a separate locking pin;
    a mounting plate, comprising:
        a housing formed of a rigid material or materials having a front and two sides in a partial rectangular configuration, and configured to partially enclose the mounting bracket within the front and two sides when mounted;
        a support structure for an exercise accessory; and
        a locking mechanism, comprising a cam attached to the mounting plate via a cam pin, the cam being configured to engage with a surface of the mounting bracket when rotated; and
    one or more fastening devices for attachment of the mounting plate to the mounting bracket.

2. The mounting system of claim 1, wherein the one or more fastening devices for attachment of the mounting bracket to the mounting plate comprise one or more of tabs and slots, pins and holes, rails and slots, bolts or screws with corresponding threads in the mounting bracket or mounting plate, and magnets.

3. The mounting system of claim 2, wherein the one or more fastening devices are configured to engage with one another via friction.

4. The mounting system of claim 3, wherein the one or more fastening devices are tabs and slots, further wherein the tabs are angled to cause increasing friction within the slots as the tabs are inserted into the slots.

5. The mounting system of claim 1, wherein the cam is mounted in-line with the support structure, and has an offset such that rotation of the cam causes an outer edge of the cam to engage with the surface of the mounting bracket.

6. The mounting system of claim 5, wherein the locking mechanism further comprises a locking tab placed at the point of engagement of the outer edge of the cam with the surface of the mounting bracket, and the mounting bracket comprises a slot in its surface at that point of engagement for receiving the locking tab.

7. The mounting system of claim 1, wherein the cam is mounted transversely to the support structure and has a graduated, wedge-shaped cross section such that rotation of the cam causes a side of the cam to engage with the surface of the mounting bracket.

\* \* \* \* \*